United States Patent
Okumura

(10) Patent No.: US 7,298,608 B2
(45) Date of Patent: Nov. 20, 2007

(54) LIQUID CRYSTAL TELEVISION INCLUDING CORD BINDING HOOK

(75) Inventor: Hikari Okumura, Takefu (JP)

(73) Assignee: Orion Electric Co., Ltd., Takefu Fukui (JP)

( * ) Notice: Subject to any disclaimer, the term of this patent is extended or adjusted under 35 U.S.C. 154(b) by 154 days.

(21) Appl. No.: 11/209,745

(22) Filed: Aug. 24, 2005

(65) Prior Publication Data

US 2006/0044480 A1    Mar. 2, 2006

(30) Foreign Application Priority Data

Aug. 27, 2004    (JP)    .............................. 2004-249121

(51) Int. Cl.
*G06F 1/16*    (2006.01)

(52) U.S. Cl. ..................... 361/681; 348/794; 349/58

(58) Field of Classification Search ................ 361/681; 348/794, 836; 349/58
See application file for complete search history.

(56) References Cited

U.S. PATENT DOCUMENTS 6,268,997 B1 *  7/2001  Hong ......................... 361/681
6,637,104 B1 * 10/2003  Masuda et al. ............... 29/832

FOREIGN PATENT DOCUMENTS

JP    2002-043766    2/2002

* cited by examiner

*Primary Examiner*—Yean-Hsi Chang
(74) *Attorney, Agent, or Firm*—Westerman, Hattori, Daniels & Adrian, LLP.

(57) ABSTRACT

The invention provides a liquid crystal television including a cord binding hook excellent in design and beautiful appearance by making it to be able to bind cords easily, and by covering the binding part of the cords with a detachable cover member. An oblong stepped recessed part 11, which makes it possible to dispose a number of input and output terminals 7 and cords 8 such as a power supply cord, is formed at a lower side of the back casing 5, a cord binding hook 21 is formed at a step surface 12 of the stepped recessed part 11 to make it possible to easily bind the number of cords 8 and lead out them downward, and a cover member 6 which covers and hides the stepped recessed part 11 is provided to be easily attached and detached.

4 Claims, 7 Drawing Sheets

LIQUID CRYSTAL TELEVISION INCLUDING CORD BINDING HOOK

The present application is based on and claims priority of Japanese patent applications No. 2004-249121 filed on Aug. 27, 2004, the entire contents of which are hereby incorporated by reference.

BACKGROUND OF THE INVENTION

1. Field of the Invention

The present invention relates to a liquid crystal television including a cord binding hook, in a liquid crystal television which can be freely installed indoor as a stand type and a wall hanging type, which makes it possible to bind cords easily without damaging the connected cords even when a number of cords are connected to a back casing of the above described television where a number of input and output terminals are disposed to perform input and output to and from a plurality of kinds of external home electric devices and the like, and which is excellent in design and beauty by covering binding portions and the like of the cords connected to the above described terminals with an attachable and detachable cover member.

2. Description of the Related Art

Conventionally, a method for holding and housing cords which are led out from electronic devices is utilized with a construction as in FIG. 6 for a liquid crystal monitor or the like used for display of a personal computer. A pivoting support part 41 of a stand 43 which supports a casing 44 is in a center of a back surface of the casing 44, and a recessed part 42, which leads out and houses two signal cord 45 and power supply cord 48 which are connected to the above described computer body not shown while holding them, is provided in the above described casing back surface 44A avoiding the pivoting support part 41, a cord holding wall 47 is formed in the recessed part 42 to project from the above described recessed part 42, and the above described cord holding wall 47 is provided with cord holding grooves 47A formed by notches corresponding to the thickness of the cords 45 and 48 at two spots to hold the above described two cords 45 and 48 by fitting them in. Further, a cover member 46 including engaging means with the above described casing back surface 44A is mounted to the above described recessed part 42. On a back surface of the cover member 46, projections 46A which prevent the above described cords 45 and 48 from removing from the cord holding grooves 47A are formed at positions opposed to the cord holding grooves 47A provided in the above described recessed part 42.

Besides, as for another electronic device, for example, the following prior art is proposed. Japanese Patent Laid-Open No. 2002-43766 (Patent Document 1) proposes a method for housing the power supply cord 48 by disposing a plurality of notches 54 for leading out the power supply cord 48 along a perimeter edge of the cover member 46 and winding the power supply cord 48 around a cord winding member 53 by its excessive length, in an electronic device 50 including a space 51 provided on a side surface of the electronic device 50 to which the power cord 48 is connected to house the power supply cord 48, the cover member 46 supported to be attachable and detachable to and from the device 50 to open and close the space 51 and cord winding member 53 with projected parts of two projections each in an inverted L-shape formed on the back surface of the cover member 46 disposed with their backs facing each other.

According to the prior art of the above described liquid crystal monitor used for the display of the personal computer, since the pivoting support part 41 of the stand 43 which supports the casing 44 is in the center on the back surface side of the above described casing 44, and the recessed part 42 which leads out and holds the two signal cord 45 and the power supply cord 48 is provided on the above described casing back surface 44A avoiding the pivoting support part 41, the vacant space of the above described casing back surface 44A is narrow, only one more recessed part 42 can be disposed at one spot on the left side of the casing back surface 44A in FIG. 6 in which the stand pivoting support part 41 disposed in the center is therebetween even if it is desired to additionally dispose the same recessed parts 42 as described above on the casing back surface 44A to bind a number of cords 45 and 48, and the number of held cords 45 and 48 which are actually two can be increased to only four, while one more of the above described cover member 46 needs to be added. As a result, the mounting operation of the above described cover member 46 increases. Besides, the cord holding wall 47 provided in the above described recessed part 42 is provided with the notches of the cord holding grooves 47A at two spots to be able to fit and hold the above described two cords 45 and 48 therein, but it has to be said difficult to hold more than two cords in the same space. On the other hand, the holding wall 47, which is provided in the above described recessed part 42, is provided with the notches of the holding grooves 47A corresponding to the thickness of the cords, and even if the position where the cords 45 and 48 are fitted and held is mistaken, the error can be easily found visually. Besides, the holding part for the above described cords 45 and 48 is in an almost sealed state by the above described cover member 46, which can be said to be an advantageous structure for dust prevention. However, if there is no problem of the vacant space for forming the recessed part 42 as described above, and when, for example, more than ten are to be held by the similar holding means, if the notches corresponding to more than ten cords 45 and 48 which individually differ in thickness are to be prepared, assignment of a cord has to be performed for each of the holding grooves 47A, and it has to be said that the operation is complicated. Besides, the structure is such that the cords 45 and 48 are held by the holding groove 47A and the projection 46A at the cover member 46 side, and when the cords 45 and 48 twist, the edge of the cover member 46 pinches the cords 45 and 48, whereby the cords 45 and 48 are crushed, and the burden on the cords 45 and 48 such as a damage and a break increases.

Besides, the cord winding member 53 in the above described Patent Document 1 is in the shape in which two of the projected parts of the projections 53 each in the inverted L-shape formed on the back surface of the cover member 46 which is detachably supported at the electronic device 50 are disposed with their backs facing each other, the back surface of the above described cover member 46 and the projected part of the above described projection 53 in the inverted L-shape form a flange part when the cord 48 is wound round, and it is excellent in winding easiness irrespective of the number of cords 48 to be wounded, but when a number of cords 48 are wounded and housed, the above described number of cords 48 are folded on each other to be wound, which is the cord winding structure extremely difficult in winding back a specific cord 48 by designating it after it is wound around and changing it to a desired length, and can be said to be unsuitable for the purpose of holding a plurality of cords 48.

SUMMARY OF THE INVENTION

The present invention has an object to realize a cord binding hook capable of easily and reliably binding cords as many as about 20 without damaging them to connect to external home electric devices and the like, in an electronic device such as a liquid crystal television, and to provide a liquid crystal television excellent in design and beauty without an unnatural force exerted on cords which are connected and led out by unifying dispositions of input and output terminals connected to a number of cords and a power supply cord to be downward to make orientation of the above described connected cords downward especially in the liquid crystal television, and by providing a detachable cover member which covers lead-out parts of the cords connected to the above described terminals which are disposed and bound by the above described cord binding hook.

In a liquid crystal television including a cord binding hook according to claim 1, in a liquid crystal television comprising a liquid crystal display part disposed at a front surface of a casing, a stand attachable and detachable in a bottom surface of the above described casing, and a back casing of a resin provided on a back surface of the above described casing, characterized in that an oblong stepped recessed part in which a plurality of input and output terminals and/or leading portions of a power supply cord and the like are disposed to be downward is provided at a lower side of the above described back casing, and cord binding hooks integrally formed to project to a rear side from a step surface of the above described stepped recessed part are disposed at a plurality of spots.

According to the construction of claim 1, in the liquid crystal television including the cord binding hook, the stand which supports the casing is connected with the support part provided at the bottom surface side of the above described casing, whereby the oblong stepped recessed part in which a plurality of input and output terminals and the leading portions of the power supply cord and the like are disposed to be downward can be provided at the lower side of the above described back casing, and therefore, a sufficient space can be secured at the lower side of the back casing, thus making it possible to lead out a number of cords. Therefore, in the case where the pivoting support part for the stand supporting the casing is placed in the center of the back surface side of the above described casing as in the liquid crystal monitor used for the display of the conventional personal computer, the limitation that the recessed part where the cords are led out and held on the above described casing back surface has to be provided only in the limited space avoiding the pivoting support part, the above described recessed parts can be placed at only two spots, the number of cords which can be led out from one spot of the above described recessed part is only two, and if the recessed parts are provided at two spots, only four cords in total can be led out can be dramatically relieved. Besides, the cord binding hooks integrally formed to project to the rear side from the step surface are disposed at a plurality of spots, and thereby, the above described number of cords can be held by being divided respectively by the cord binding hooks provided at a plurality of spots and can be led out toward the lower side of the above described back casing. Further, the above described cord binding hook is integrally formed to project to the rear side from the step surface of the above described back casing of the resin, and there is no fear of damaging and breaking the bound cords by the above described hook.

The liquid crystal television including the cord binding hook in claim 2 of the present invention is, in the liquid crystal television including the cord binding hook according to claim 1, characterized in that the above described cord binding hook has two projections each in the inverted L-shape faced to each other and disposed in a substantially gate shape.

According to the construction of claim 2, the above described two projections each in the inverted L-shape are faced to each other to form the substantially gate shape, and the hooking structure for the cords which houses and binds the cords in the space between the above described two projections each in the inverted L-shape is formed, thus making it possible to easily hook and hold a plurality of cords at cord binding hooks at a plurality of spots, and making it possible to easily removing the cords.

The liquid crystal television including the cord binding hook in claim 3 of the present invention is, in the liquid crystal television including the cord binding hook according to claim 1 or 2, characterized in that the above described stepped recessed part is provided with an attachable and detachable cover member which covers the above described plurality of input and output terminals and/or leading portions of the power supply cord and the like and the above described cord binding hook.

According to the construction of claim 3, the above described stepped recessed part is provided with the attachable and detachable cover member which covers the above described plurality of input and output terminals and the leading portions of the power supply cord and the like, and the cord binding hooks at two spots disposed in the above described substantial gate shape, whereby the connecting spots of the above described input and output terminals and the cords, and the above described cord binding hooks can be covered with the cover member. Besides, the oblong stepped recessed part is provided at the lower side of the above described back casing, and a large space for leading out the above described cords can be provided between the above described cover member and the stepped recessed part.

DETAILED DESCRIPTION OF THE PREFERRED EMBODIMENTS

An embodiment as a best mode for carrying out the present invention will be described according to FIGS. 1 to 5 hereinafter. It goes without explaining that the present invention is also easily applicable to the other things than what is explained in the embodiment without departing from the spirit of the invention.

Figure 2:
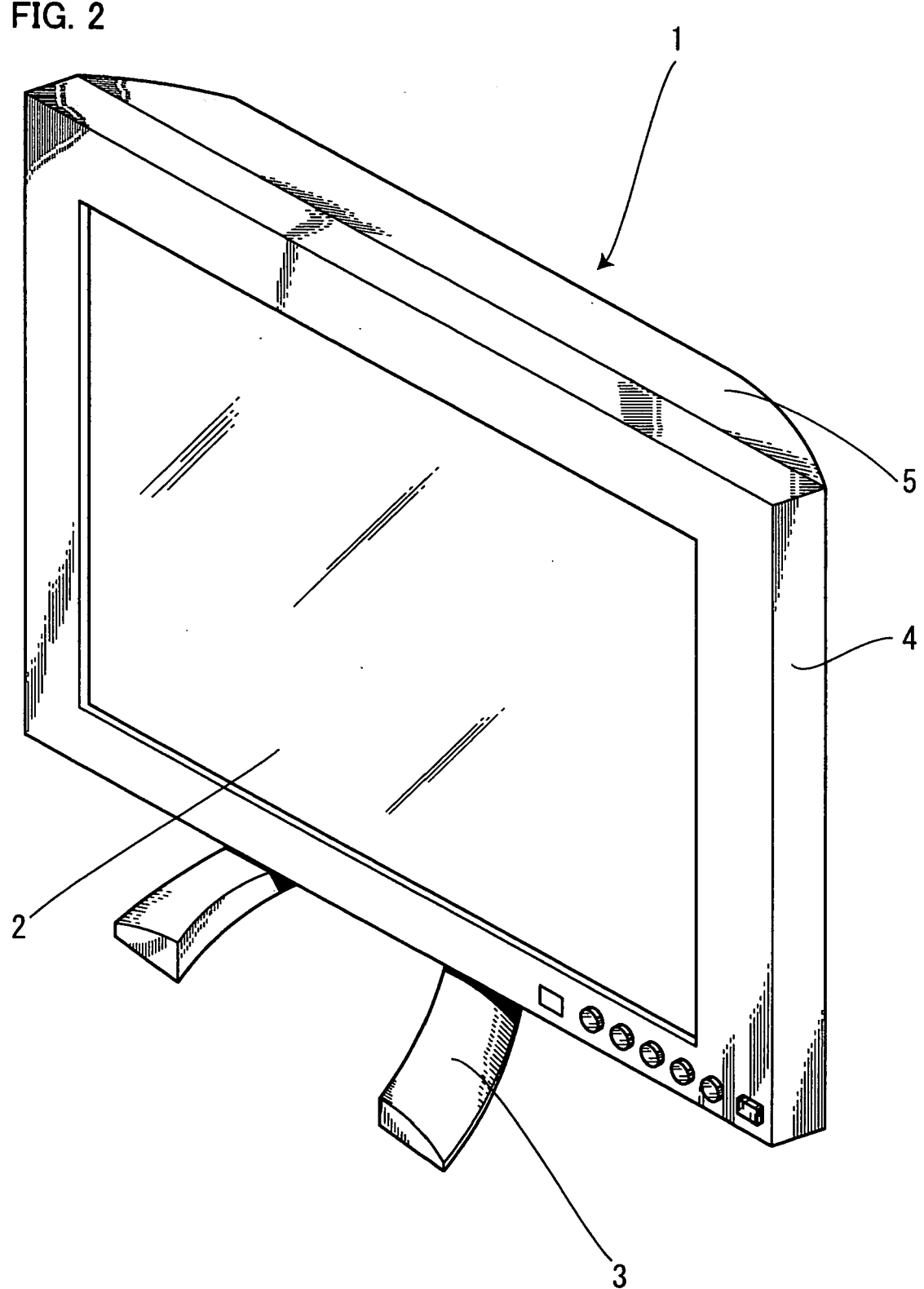
FIG. 2 is a front perspective explanatory view of a liquid crystal television in the present invention.
Figure 3:
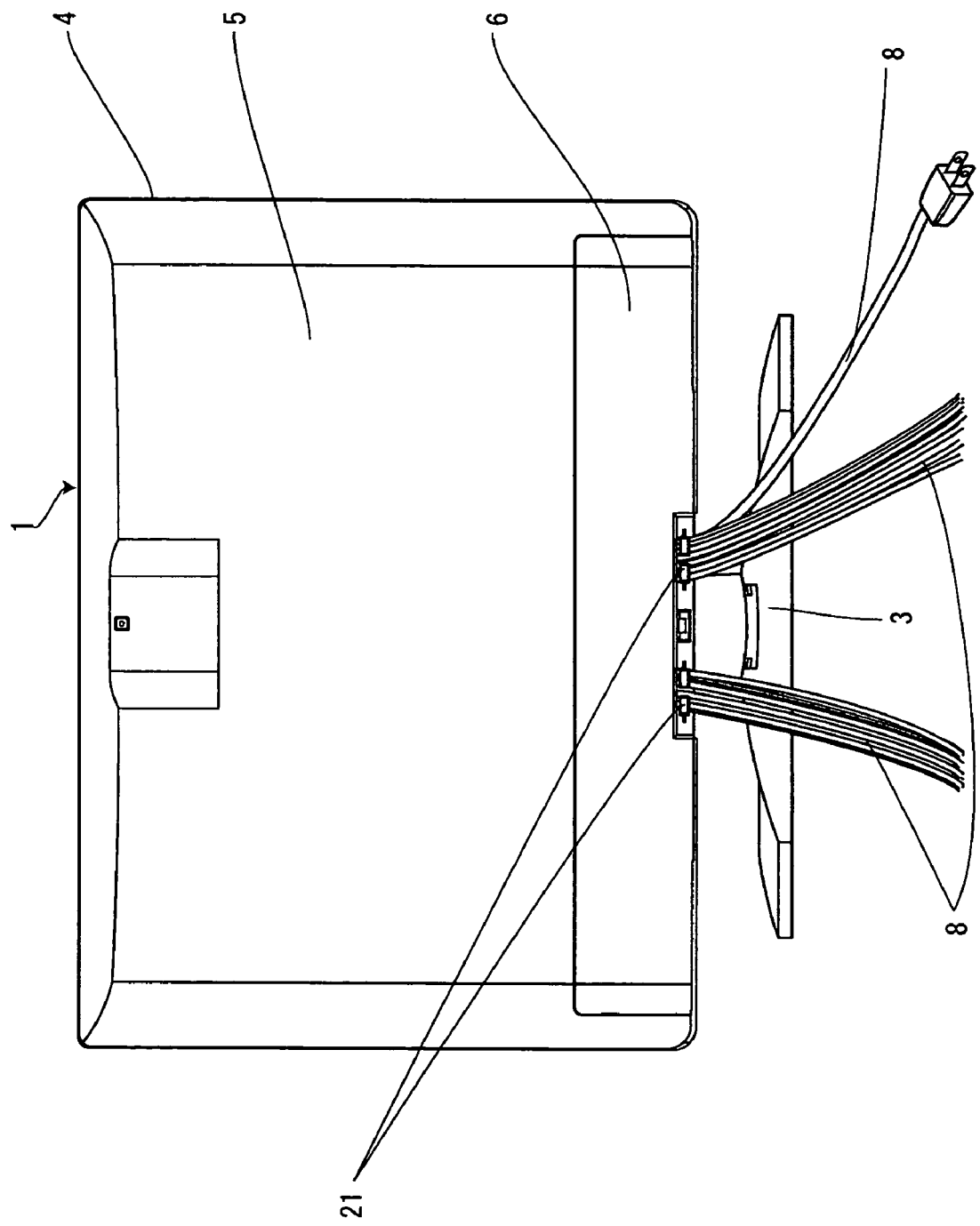
FIG. 3 is an explanatory view of a back surface of the above described liquid crystal television in the present invention.

FIG. 2 is a front perspective explanatory view of a liquid crystal television in the present invention, and FIG. 3 is a rear explanatory view of the above described liquid crystal television.

In a liquid crystal television 1 in FIG. 2, a liquid crystal display 2 is disposed at a front surface of a casing 4, a stand 3 is connected to a center of a bottom surface side of the above described casing 4 to support the above described casing 4. A back casing 5 shown in FIG. 3 is disposed at a back surface of the above described liquid crystal television 1, a plurality of cords 8 are held and bound by a cord binding hook not shown and are led out downward from a stepped recessed part not shown provided at a lower side of the back casing 5. Further, a cover member 6 covers the above described stepped recessed part from which the above described cords 8 are led out.

Figure 1:
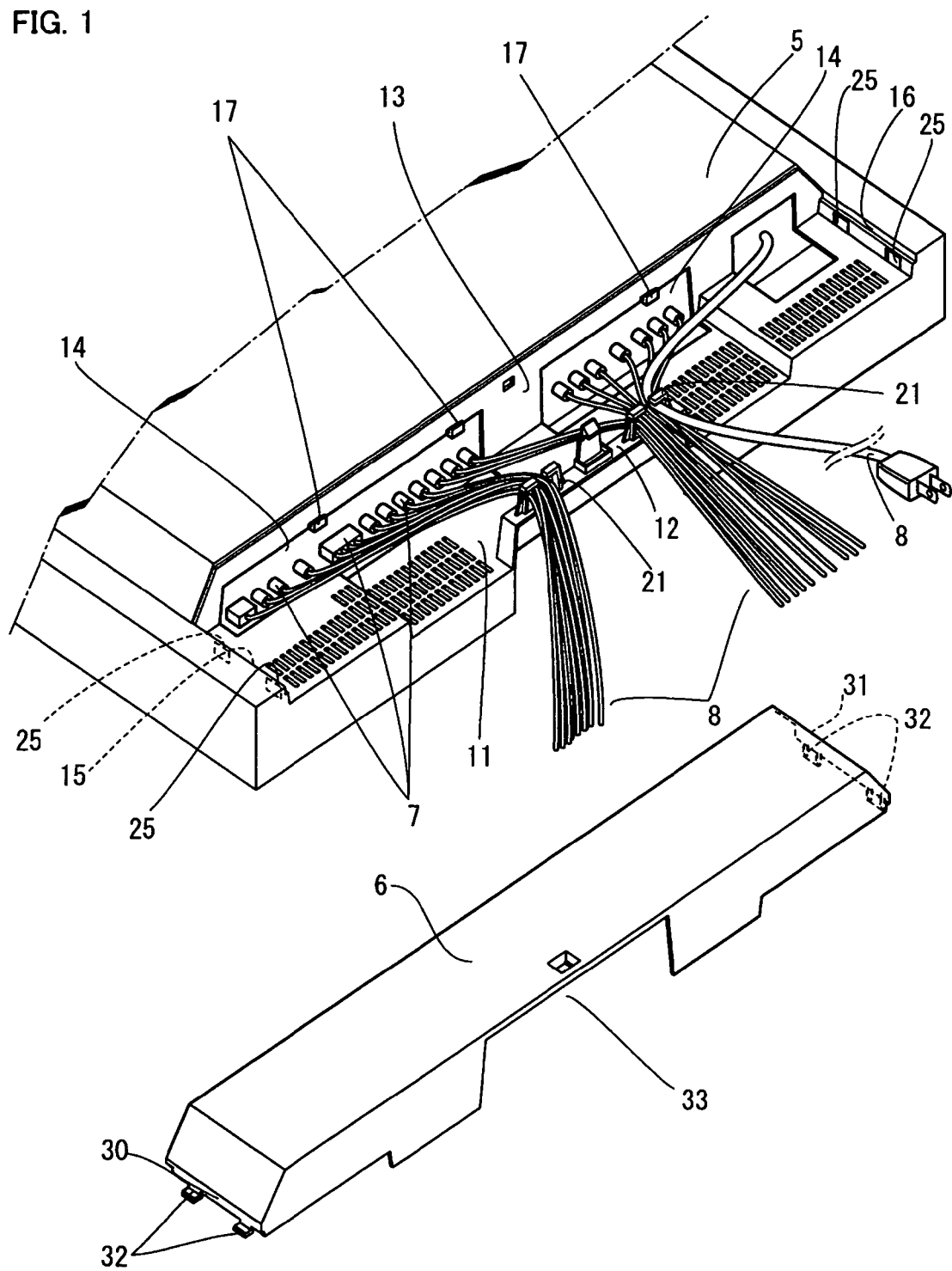
FIG. 1 is a perspective explanatory view showing a construction before cords held by a cord binding hook is covered with a cover member, showing one embodiment in the present invention.

Subsequently, FIG. 1 is a perspective explanatory view showing a construction before the cords held by the cord binding hook is covered with the cover member, which shows one embodiment in the present invention.

An oblong stepped recessed part 11 is provided at the lower side of the above described back casing 5, input and output terminals 7 and a power supply cord 8 are disposed at about twenty spots in total in three open windows 14 which are disposed in a downward wall surface 13, and cords 8 are connected to them respectively. On a step surface 12 which projects from the above described stepped recessed part 11, cord binding hooks 21, which project to a rear side from the step surface 12 and are formed integrally therewith, are disposed at two spots which are in the vicinity of a support part not shown of the above described stand 3, the cords 8 held by the above described cord binding hook 21 are bound at the two spots in the vicinity of the support part of the stand 3 and can be led out to the lower side, and therefore, the cords 8 can be prevented from being untidy, thus making it possible to enhance beauty.

Figure 4:
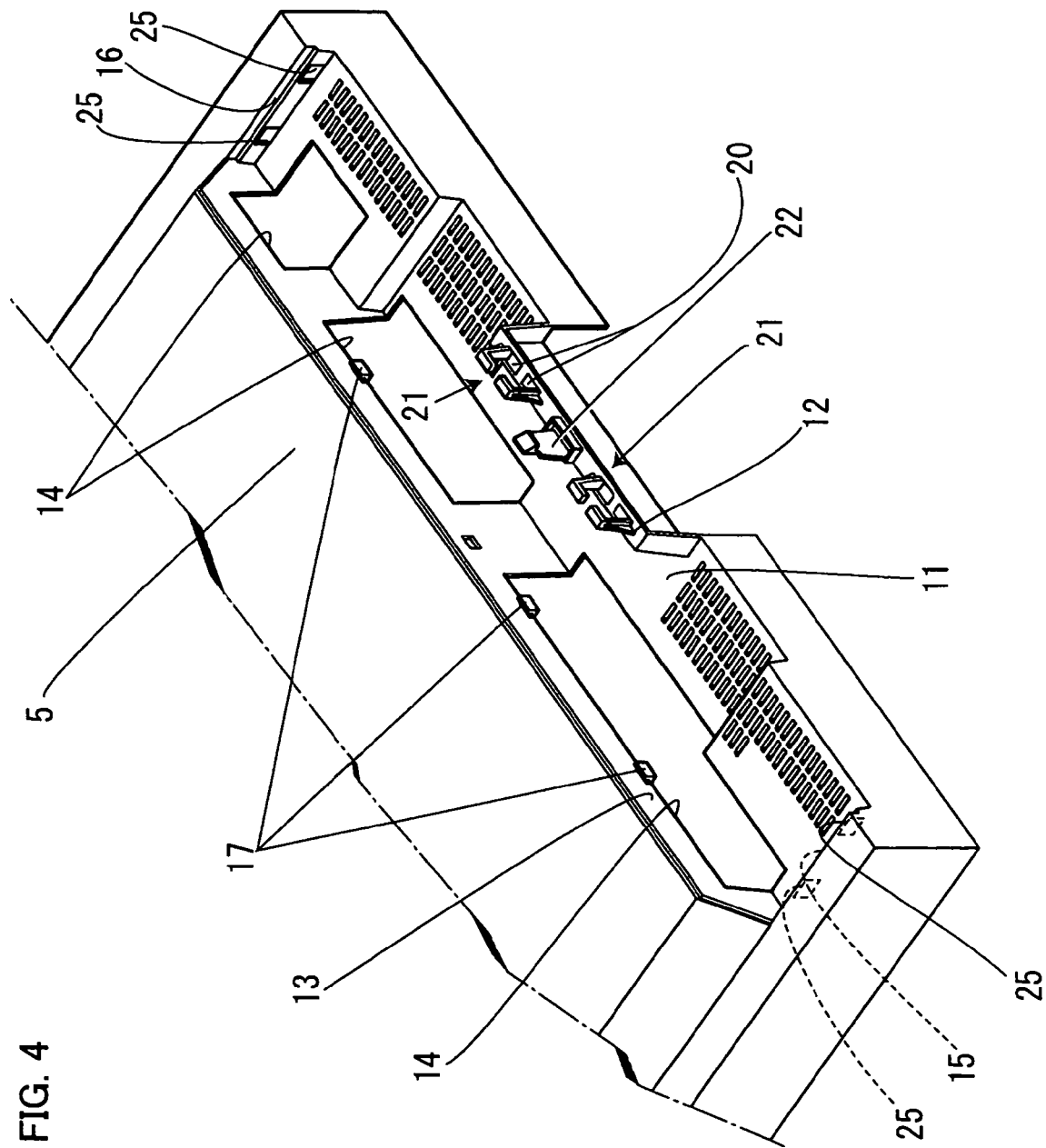
FIG. 4 is a perspective explanatory view showing a stepped recessed part of a back casing and a cord binding hook in one embodiment of the present invention.

FIG. 4 is a perspective view of the back casing 5 seen in the direction of a lower rear side of the liquid crystal television 1, and the stepped recessed part 11 is formed at the lower side of the above described back casing 5. The open windows 14 for disposing the input and output terminals 7, the power supply cord 8 and the like are formed at three spots in the downward wall surface 13 of the back casing 5, and hamate locking parts 17 which support the cover member 6 are formed at upper edges of the open windows 14. Besides, engaging holes 25 which engage with locking claw parts 32 formed at both end sides 30 and 31 of the cover member 6 are formed in both lateral wall surfaces 15 and 16 of the above described stepped recessed part 11. Further, the step surface 12 is formed to project near a lower end of a center of the above described stepped recessed part 11, a lever-shaped locking part 22 which locks the above described cover member 6 is formed at a center of the step surface 12 while on its both sides, the cord binding hooks 21 each with two projections 20 each in the inverted L-shape faced to each other and disposed in a substantial gate shape are formed integrally with the above described back casing 5 at two spots.

According to the construction of the above described back casing 5, about twenty cords 8 which are connected to the input and output terminals 7 disposed in the three open windows 14 formed on the above described downward wall surface 13 are distributed and fitted to the above described cord binding hooks 21 formed at the two spots, and can be held by them. Besides, the cover member 6 can be easily mounted and locked by the hamate locking parts 17, the engaging holes 25, and the lever-shaped locking part 22 which are disposed around the above described stepped recessed part 11.

Next, the cover member which covers the stepped recessed part of the above described back casing will be described hereinafter with reference to FIG. 5.

Figure 5:
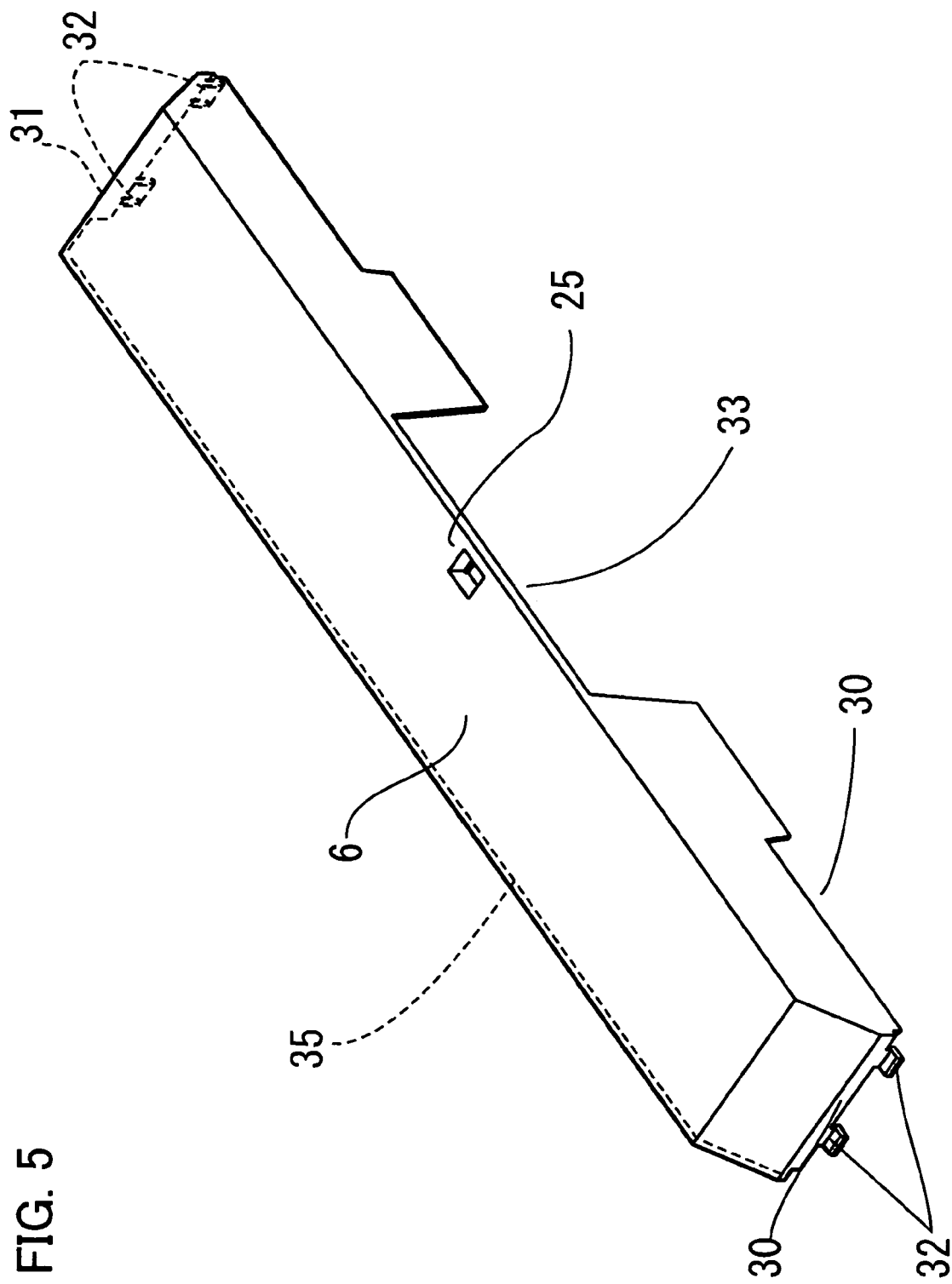
FIG. 5 is a perspective explanatory view showing a cover member covering the stepped recessed part of the back casing in one embodiment of the present invention.
Figure 6:
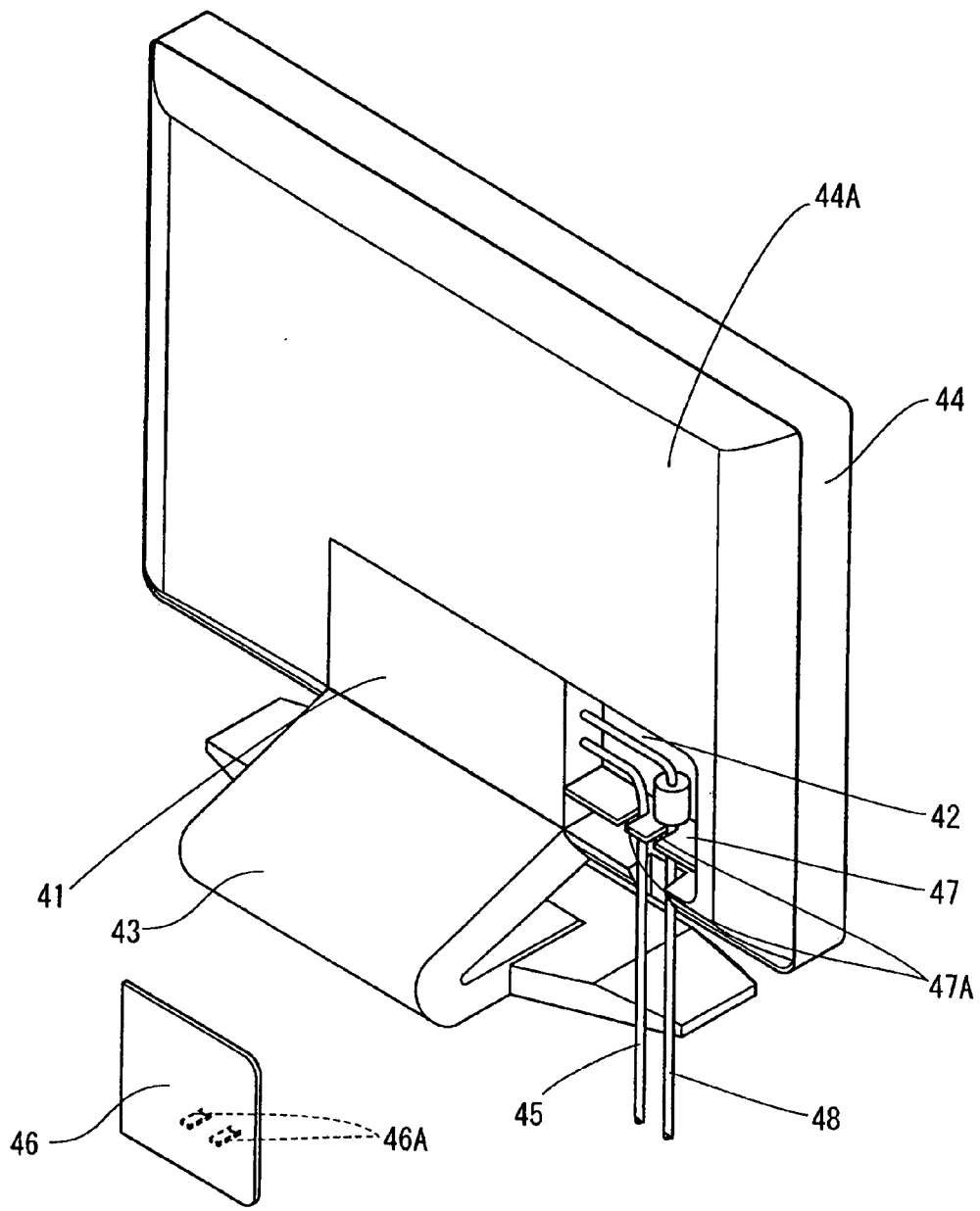
FIG. 6 is an explanatory view showing a structure for holding and housing cords in a back surface of a liquid crystal display monitor used for a conventional personal computer.
Figure 7:
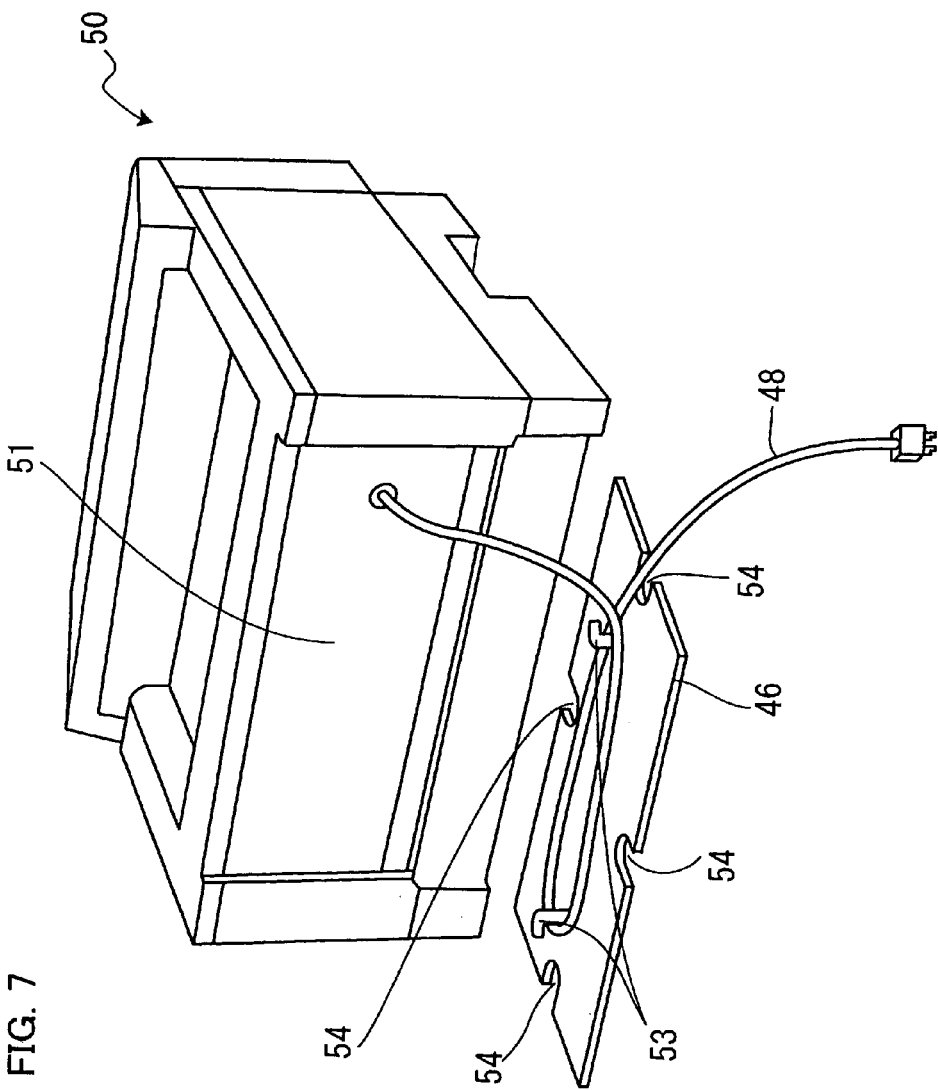
FIG. 7 is an explanatory view showing a structure for winding and housing cords in a conventional electronic device.

The cover member 6 shown in FIG. 5 is provided with an engaging wall 35, which engages with the hamate locking parts 17 formed at the stepped recessed part 11 of the above described back casing 5, at its upper end edge, the locking claw parts 32 formed at both the end sides 30 and 31 of the above described cover member 6, and an engaging hole 25, which engages with the above described lever-shaped locking part 22, in a center near the lower end of the above described cover member 6, so that the cover member 6 can be easily mounted to the above described back casing 5 to cover the above described oblong stepped recessed part 11. Besides, a step for forming a cord leading out space 33 is provided by being notched at a position, which faces the cord binding hooks 21 disposed at the two spots, on the lower end side of the above described cover member 6, so that the cords 8 which are held and bound by the above described cord binding hooks 21 can be led out in the downward direction from the cord leading out space 33.

According to the liquid crystal television 1 including the cord binding hook 21 of the present invention as described above, the stand 3 which supports the casing 4 is provided at the bottom side of the casing 4, whereby it becomes possible to provide the oblong stepped recessed part 11 at the lower side of the back casing 5 while maintaining the thin shape, and it is possible to connect and lead out about twenty cords 8 toward the lower side from the downward wall surface 13 of the above described stepped recessed part 11. Further, the above described about twenty cords can be easily fitted to and held at the cord binding hooks 21 provided at the two spots in the vicinity of the support part of the stand 3 provided at the center of the bottom side of the casing 4, and when predetermined cords 8 are removed, only the predetermined cords can be easily removed from the cord binding hook 21 among the bound cords 8. Besides, the above described cord binding hook 21 is made of a resin which is formed integrally with the back casing 5, and has no possibility of damaging the insulating coating of the cords 8. Further, the above described cords 8 which are distributed to the above described two spots to be held and led out can be unified to be downward, and therefore, when the above described thin liquid crystal television 1 is used as a stand type, about twenty cords 8 can be systematically led out downward from the two spots in the vicinity of the stand 3, thus making it possible to enhance the beauty. Besides, when the stand 3 of the above described thin liquid crystal television 1 is removed and the liquid crystal television 1 is watched and listened to as a wall-hanging type, the cords 8 are bound at the above described two spots and led out downward, and therefore, the cords 8 can be prevented from being untidy, thus making it possible to enhance the appearance of the above-described liquid crystal television 1.

Besides, since the cover member 6, which is capable of covering the above described stepped recessed part 11 by the locking means 17, 22, 25 and 32 easy to attach and detach, is provided, dust and dirt can be prevented from accumulating on connecting parts of the input and output terminals 7 and the cords 8 which are connected to the above described input and output terminals 7, bound and held by the cord binding hook 21 and led out, the cover member 6 prevents the cords from directly touching the other parts and being electrically short-circuited, and the coating of the cords 8 from breaking, and therefore, when the above described liquid crystal television 1 is watched and listened to as a stand type, it can be installed in a narrow place in the vicinity of the other things behind it, while when it is used as a wall hanging type, it can be installed in close contact with a wall surface, thus enabling an audience to install the above described thin liquid crystal television 1 freely and optionally without having any limitation of the installation place.

This embodiment is described in detail above, but the present invention is not limited to the above described embodiment, and various modified embodiments can be made within the range of the spirit of the present invention. For example, as for the cord binding hook 21, the sizes of the two projections each in the inverted L-shape facing each other may not be the same if only they are capable of holding a plurality of cords 8 by fitting them therein, and the cover member 6 does not have to be as oblong as full breadth of the back casing 5 if only the cover member 6 is capable of covering the range in which the above described cords 8 are led out and held, and the present invention is not limited to the above described embodiment, and the shape and the locking method may be properly changed in consideration of usability, and the like, and may be properly selected.

According to the invention of the liquid crystal television including the cord binding hook according to claim 1, by providing the attaching and detaching part of the stand at the bottom surface side of the above described casing, the oblong stepped recessed part where a plurality of input and output terminals and the leading portions of the power supply cord and the like are disposed downward can be provided at the lower side of the above described back casing, therefore making it possible to secure a sufficient space at the lower side of the back casing to be able to lead out and hold the above described number of cords, and making it possible to realize thinning of the liquid crystal television without necessity of increasing thickness of the above described liquid crystal television. Since the cord binding hooks which are integrally formed to project to the rear side from the step surface of the above described stepped recessed part are disposed at a plurality of spots, a number of cords are respectively distributed and held by the cord binding hooks provided at the plurality of spots, and can be led out toward the lower side of the above described back casing, and therefore, a number of cords can be organized and led out. Further, the above described cord binding hooks are formed integrally with the back casing, and therefore, the number of components does not increase.

According to the invention of the liquid crystal television including the cord binding hook according to claim 2, the above described two projections each in the inverted L-shape are faced to each other to form the substantial gate shape, and the hooking structure for the cords which houses and binds the cords in the space between the above described two projections each in the inverted L-shape is formed, thus making it possible to easily and reliably hook and hold a number of cords, and making it possible to easily remove the cords, as a result of which, if the stand is removed and the liquid crystal television is changed to the wall hanging type, the cords binding function is not impaired.

According to the invention of the liquid crystal television including the cord binding hook according to claim 3, the connecting spots of the above described input and output terminals and the cords, and the above described cord binding hooks can be covered with the cover member, and therefore, the liquid crystal television excellent in design and beauty can be realized. Besides, since a large space can be provided between the above described cover member and the stepped recessed part, a plurality of cords can be bound and led out with the hook at one spot, and by providing a plurality of hooks, a number of cords can be bound and led out. Besides, disposition space for the holding part for the cords is not divided into two spots by the pivoting support part of the stand as in the prior art, and the above described oblong stepped recessed part can be covered with only one cover member.

What is claimed is:

1. A liquid crystal television including a cord binding hook comprising a liquid crystal display part disposed at a front surface of a casing, a stand attachable and detachable in a bottom surface of said casing, and a back casing of a resin provided on a back surface of said casing, characterized in that an oblong stepped recessed part in which a plurality of input and output terminals and/or leading portions of a power supply cord and the like are disposed to be downward is provided at a lower side of said back casing, and cord binding hooks integrally formed to project to a rear side from a step surface of said stepped recessed part are disposed at a plurality of spots.

2. The liquid crystal television including the cord binding hook according to claim 1, characterized in that said cord binding hook has two projections each in an inverted L-shape faced to each other and disposed in a substantially gate shape.

3. The liquid crystal television including the cord binding hook according to claim 1, characterized in that said stepped recessed part is provided with an attachable and detachable cover member which covers said plurality of input and output terminals and/or leading portions of the power supply cord and the like and said cord binding hook.

4. The liquid crystal television including the cord binding hook according to claim 2, characterized in that said stepped recessed part is provided with an attachable and detachable cover member which covers said plurality of input and output terminals and/or leading portions of the power supply cord and the like and said cord binding hook.

* * * * *